July 23, 1935. W. L. WETTLAUFER 2,009,126
GYRATING SCRUBBER
Filed Feb. 11, 1933 2 Sheets-Sheet 1
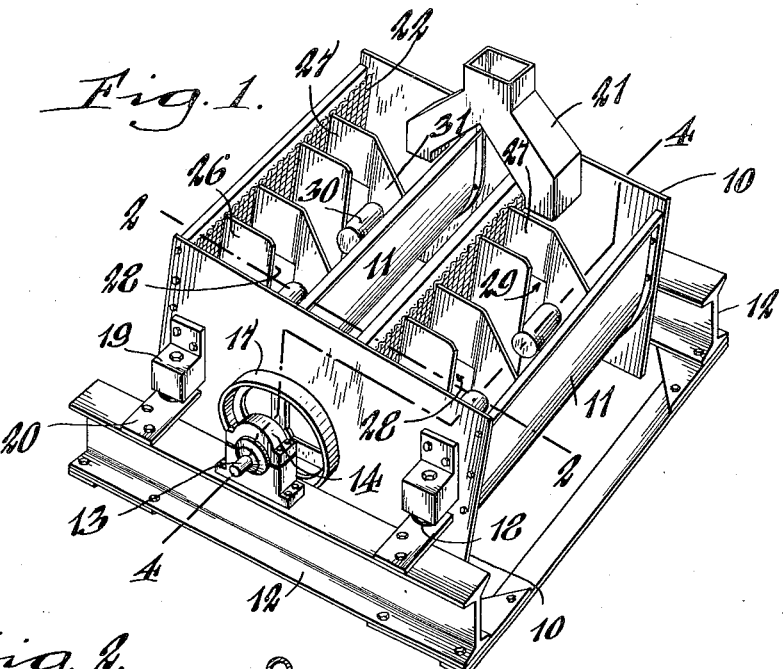
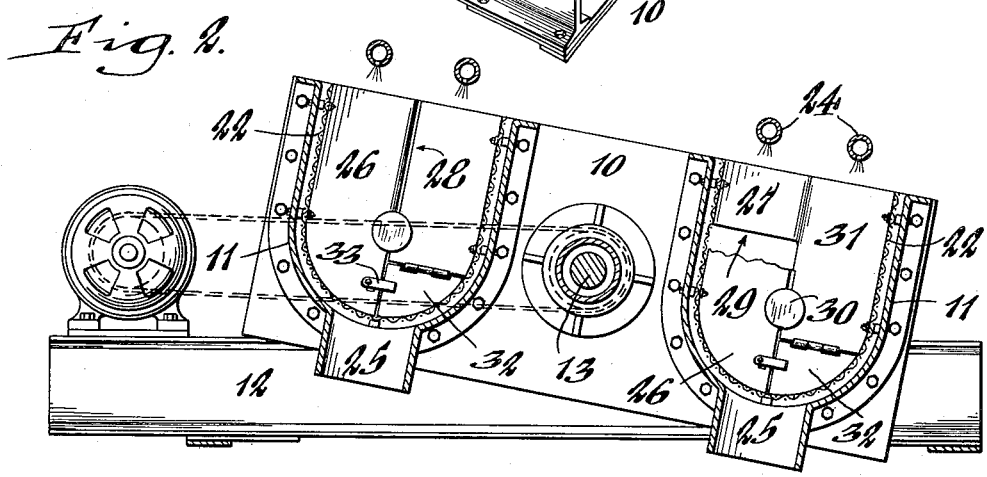
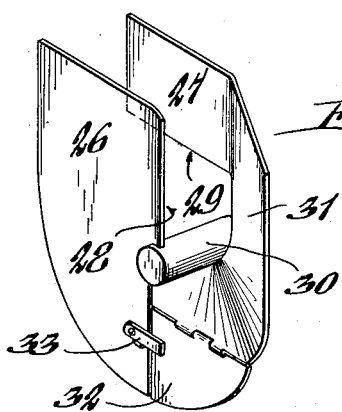
Inventor,
William L. Wettlaufer,
by Walter P. Geyer
Attorney.

July 23, 1935.  W. L. WETTLAUFER  2,009,126
GYRATING SCRUBBER
Filed Feb. 11, 1933  2 Sheets-Sheet 2
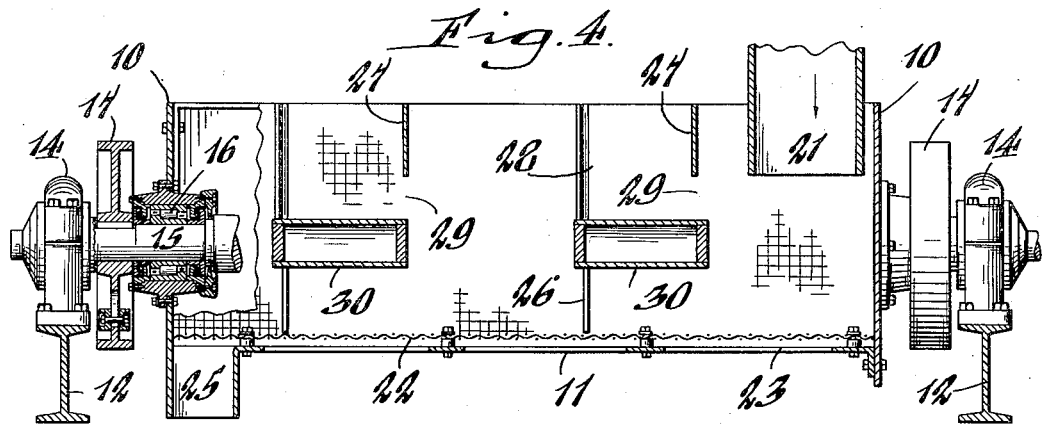
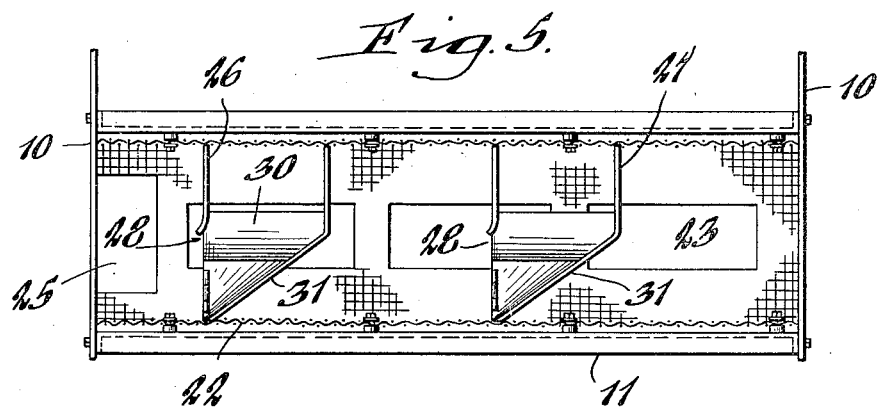
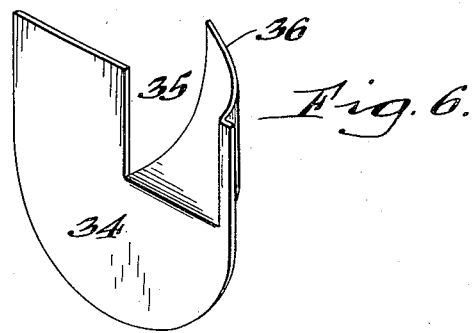
Inventor,
William L. Wettlaufer,
by Walter P. Guyer
Attorney.

Patented July 23, 1935

2,009,126

UNITED STATES PATENT OFFICE 2,009,126

GYRATING SCRUBBER

William L. Wettlaufer, Buffalo, N. Y., assignor to The W. S. Tyler Company, Cleveland, Ohio, a corporation of Ohio Application February 11, 1933, Serial No. 656,275

10 Claims. (Cl. 259—72)

This invention relates generally to a machine for the treatment of sand, gravel, stone and like materials, and particularly to a machine for washing and scrubbing such materials.

One of its objects is the provision of a scrubbing apparatus of this character which is thorough and efficient in its scrubbing action and yet will not fracture or break the material being treated.

Another object of the invention is to provide a gyrating scrubber which is so designed and constructed as to impart to the material a positive tumbling or cascading and volcanoing-like motion, whereby all surfaces of the material are effectually exposed to a washing and scrubbing action.

A still further object is to provide a simple, compact and sturdy scrubbing machine which affords maximum capacity at a minimum consumption of water and power.

In the accompanying drawings:—Figure 1 is a perspective view of a scrubbing apparatus embodying my invention. Figure 2 is an enlarged cross section thereof taken on line 2—2, Figure 1. Figure 3 is a detached perspective view of a portion of the positive control baffling units applied to the scrubber decks. Figure 4 is an enlarged longitudinal section taken substantially in the plane of line 4—4, Figure 1. Figure 5 is a fragmentary top plan view of one of the scrubbing decks. Figure 6 is a perspective view of a slightly modified form of one of the positive control baffle elements.

Similar characters of reference indicate corresponding parts throughout the several views.

In connection with the invention a vibratory or shaking body or carrier is provided which may be of any suitable construction, that shown in the drawings, by way of example, being of a type to gyrate in a vertical plane and consisting of end plates 10, 10 between which are arranged one or more substantially trough-shaped scrubbing decks 11 for the material to be washed and scrubbed. This gyrating body is preferably disposed in a substantially horizontal position between suitable beams 12 and is balanced or supported for rotating vibratory movement on a rotary shaft 13 passing through the end walls 10 of the body and journaled in suitable bearings 14 of the body and journaled in suitable bearings 14 attached to said beams. This shaft constitutes the drive element of the machine and imparts to the live frame or body 10, 11 a positive, circular or gyrating movement, whereby all points of such body are vibrated in a circular path or orbit and to this end the shaft has eccentric portions 15, as seen in Figure 4, on which said body is supported, the latter having roller or like bearings 16 attached to its end walls and in which the eccentric portions of the shaft are journaled. For the purpose of maintaining the machine in proper balance, the shaft 13 is provided with counterbalanced wheels 17. To steady and hold the gyrating body in its proper balanced position on the shaft, its opposite side portions are yieldingly suspended or supported by any suitable means, for example, coil springs 18 arranged in housings 19 secured to the end plates 10 and seated at their lower ends on supporting members 20 secured to the beams 12. For a purpose which will hereafter appear, this body is preferably pitched or inclined to the horizontal in a direction transversely of the gyrating axis of the body.

In the embodiment of the invention shown in the drawings, I have shown a machine provided with two scrubbing decks which are disposed at opposite sides of the operating shaft 13 and are substantially parallel thereto, although it is to be understood that one or any number of such decks may be employed depending on the capacity desired. The material to be scrubbed or cleaned is delivered to the decks 11 by any suitable feed arrangement, such for example, as a hopper 21 located at the rear end of the machine and discharging at its lower end into the respective decks 11, 11. The lower portion of each scrubbing deck is approximately semi-circular in cross section and is preferably roughened on its interior surface for the purpose of creating frictional contact between the material and the trough walls, so as to impart to the material a tumbling-like action in response to the gyrating motion of the machine body, the particles of material taking a loop or circular-like path. By way of example, I have shown each trough-shaped deck as having an inner section or shell 22 spaced from the solid portion 11 of the deck and preferably constructed of wire mesh, punched plates or other suitable material. By this arrangement, the desired roughed surface is provided and a combined screening and scrubbing action is accomplished within the decks, the foreign or removed material dropping through the screen section 22 into the outer shell 11 and being washed away by the water which is used during the cleaning and scrubbing operations. The bottom of the deck shell 11 has openings 23 through which the foreign matter and wash water are discharged. For the purpose of delivering water to the scrubbing decks, I provide one or more spray pipes 24 extending lengthwise over each deck. The cleaned or scrubbed material is discharged from the deck through discharge openings 25 located at the front end of the machine, the material dropping through these openings by gravity into a suitable receptacle for receiving it.

For the purpose of guiding and directing the material in a substantially spiral-like course lengthwise through the scrubbing decks in response to the circular-like paths of motion transmitted to the material transversely of the decks by the gyrating body, and further to assist in breaking up or dislodging any foreign matter from the material being scrubbed, I provide means disposed transversely of the decks for effectually accomplishing these results. These means preferably consist of positive control baffles or partitions 26 and 27 which are disposed in spaced relation lengthwise of each deck, and as seen in Figure 3, may be arranged in sets or pairs. To direct the feeding of the material in a spiral-like course lengthwise of the deck and through the compartments resulting from this positive control baffle arrangement, one of the baffles of a set is constructed to provide an opening 28 at one side of the longitudinal center line of the scrubbing deck with its inlet end disposed above the axial center line of the deck, while the other baffle of a set is provided at the opposite side and below the axial center line of the deck with an opening 29, such openings being positioned in the path of the downward and upward turns of the material for establishing communication between the respective compartments, and in response to the gyrating action of the scrubber-body the material is compelled to take a spiral-like course lengthwise of the deck, the material being practically crowded or forced from the feed end of the machine to its discharge end. As shown in Figures 3 and 5, the opening 28 is formed by terminating the baffle 26 substantially centrally of the scrubbing deck. The baffles 26, 27 of a set may be joined in proper spaced relation by an axially-disposed tie member 30, which member also assists in directing the material in its proper course through the machine. The baffle 27 is preferably provided with a deflecting portion 31 which is displaced toward the opening 28 provided by the companion baffle 26 and serves to direct the material toward such opening and thence into the next adjoining compartment provided by the baffles.

As previously mentioned, the gyrating body is preferably pitched or inclined in a direction transversely of its gyrating axis, as seen in Figures 1 and 2, this inclined position bringing the decks 11 in a tilted position to the vertical whereby the force of gravity acts to provide a comparatively sharp falling or cascading-like action of the material as it passes on its downward spiral path. During this action the material is at times impacted against the deck walls and at other times against the deflecting portions 31 of the baffles 27, resulting in a thorough scrubbing action on the material.

As seen in Figures 1, 4, and 5, the space between adjoining sets of partitions 26, 27 may be somewhat wider than the space between the baffles of a set, so that during the spiral-like travel of the material through the deck it makes several complete turns or circular paths of motion in the compartments between each set of baffles, while the material makes one turn or circular path of motion in the compartment formed between the baffles of a set.

For the purpose of conveniently cleaning the decks of the scrubber from time to time, I provide one of the baffles, say the baffle 27, with a normally closed vertically-swinging gate 32, the gate being held in such normal position by a latch 33. During the cleaning of the deck, the latch is raised and the gate is free to swing to an open position by the force of the material in the trough.

In Figure 6 I have shown a slightly modified form of baffle 34 which may be substituted for the baffle 26. In this form the baffle 34 extends the full width of the scrubbing deck and has an opening 35 and a deflecting wall 36 which directs the material on its cascading action toward such opening and into the next compartment.

I claim as my invention:—

1. A machine of the character described, comprising a body, a substantially trough-shaped scrubbing deck mounted thereon and having a substantially semi-circular lower material-contacting portion, means disposed transversely of said deck in longitudinally spaced relation to provide a plurality of inter-communicating compartments, said compartment-forming means having alternate passages of communication between the upper and lower portions of the compartments, and at opposite sides of the longitudinal axis of the trough, and means for gyrating said body in substantially circular paths in a plane crosswise of its scrubbing deck, whereby like paths of motion are transmitted to the material as it is moved lengthwise through the deck.

2. A machine of the character described, comprising a body, a substantially trough-shaped receiving deck mounted thereon and having its bottom of substantially semi-circular shape in cross section, baffles disposed transversely of said deck in longitudinally spaced relation to provide intercommunicating compartments, and means for gyrating said body in substantially circular paths in a plane crosswise of its deck, said baffles having alternately disposed passages therein at opposite sides of the longitudinal axis of the deck to provide a substantially spiral-like course of the material lengthwise of said deck from one compartment to another.

3. A machine of the character described, comprising a body, a substantially trough-shaped scrubbing deck mounted thereon and having a substantially semi-circular bottom described about its longitudinal center line, baffles disposed transversely of said deck in longitudinally spaced relation, alternate baffles having communicating passages at opposite sides of the longitudinal center line of the deck, respectively, to direct an upward and downward travel of the material about the center line of said deck, and means for gyrating said body in substantially circular paths crosswise of its receiving deck.

4. A machine of the character described, comprising a body, a substantially trough-shaped receiving deck mounted thereon, baffles disposed transversely of said deck in longitudinally spaced relation and each having a passage therein to provide intercommunicating compartments, the passages in some of the baffles being disposed with their inlet ends at one side of and above the longitudinal axis of the deck and the passages in the alternately arranged baffles being disposed at the opposite side and below the center line of said deck, and means for gyrating said body in substantially circular paths crosswise of its receiving deck.

5. A machine of the character described, comprising a body, a substantially trough-shaped receiving deck mounted thereon, baffles disposed transversely of said deck in longitudinally spaced relation to provide intercommunicating compartments, some of the baffles terminating short of one of the deck-sides to provide communicating passages for the material at one side of the longitudinal center line of the deck, and the alternate baffles extending from side to side of the deck and having passages for the material disposed below and at the opposite side of the center line of said deck, and means for gyrating said body in substantially circular paths crosswise of its deck.

6. A machine of the character described, comprising a body, a substantially trough-shaped receiving deck mounted thereon, baffles disposed transversely of said deck in longitudinally spaced relation to provide intercommunicating compartments, some of the baffles terminating short of one of the deck-sides to provide communicating passages for the material at one side of the longitudinal center line of the deck and the alternate baffles extending from side to side of the deck and having passages for the material disposed below and at the opposite side of the center line of said deck, said last-named baffles having portions deflected toward the passages of the first-named baffles for directing the material thereto, and means for gyrating said body in substantially circular paths crosswise of its deck.

7. A machine of the character described, comprising a frame, a gyrating body supported on said frame and inclined to the horizontal in a direction transversely of the gyrating axis of said body, a substantially trough-shaped receiving deck for the material to be treated applied to said body and extending generally in the direction of its gyrating axis, means for gyrating said body in substantially circular paths in a plane crosswise of its receiving deck, and means in said deck for baffling the flow of material therethrough and causing it to take a spiral-like course through the deck, the inclined position of said body combined with said baffling means effecting a cascading and volcanoing-like motion to the material in circular-like paths in traveling from one end of the deck to the other.

8. A machine of the character described, comprising a gyrating body including a substantially trough-shaped deck for the material to be treated, said deck extending generally in the direction of the body-axis, and pairs of longitudinally-spaced baffles disposed transversely of said deck and having a tie member disposed therebetween and axially of the deck, one of the baffles of a pair having an opening therein at one side of the deck-axis and the other baffle of a pair having an opening therein at the opposite side of the deck-axis, said last-named baffle having a deflecting portion directed toward the opening in the companion baffle.

9. A machine of the character described, comprising a gyrating body including a substantially trough-shaped deck for the material to be treated, said deck extending generally in the direction of the body-axis, and pairs of longitudinally-spaced baffles disposed transversely of said deck and having a tie member disposed therebetween and axially of the deck, one of the baffles of a pair having an opening therein at one side of the deck-axis and the other baffle of a pair having an opening therein at the opposite side of the deck-axis, said last-named baffle having a deflecting portion directed toward the opening in the companion baffle, and a longitudinal displaceable portion at its lower end.

10. A machine of the character described, comprising a gyrating body, means disposed substantially centrally of said body for gyrating it in substantially circular paths about a horizontal axis, substantially trough-shaped receiving decks for the material to be treated applied to said body symmetrically at opposite sides of its gyrating axis and extending generally in the direction of such axis, and baffle means disposed crosswise of said decks and in spaced relation lengthwise thereof for guiding and directing the material in spiral-like paths therethrough in response to the gyrating action transmitted to said body.

WILLIAM L. WETTLAUFER.